United States Patent

Berney

[15] 3,675,147

[45] July 4, 1972

[54] CIRCUIT FOR REGULATING THE MEAN FREQUENCY OF AN OSCILLATING SYSTEM

[72] Inventor: Jean Claude Berney, Lausanne, Switzerland

[73] Assignee: Compagnie des Montres Longines, Francillon S.A., Bern, Switzerland

[22] Filed: May 5, 1970

[21] Appl. No.: 34,733

[30] Foreign Application Priority Data

May 8, 1969 Switzerland ....................7066/69

[52] U.S. Cl. ....................331/8, 331/14, 331/27, 331/36 C, 331/117 R, 331/177 R, 331/179

[51] Int. Cl. ....................H03b 3/04

[58] Field of Search ....................331/8, 14, 27, 36 R, 36 C, 331/177 R, 179, 117 R

[56] References Cited

UNITED STATES PATENTS

| | | | |
|---|---|---|---|
| 3,076,154 | 1/1963 | Rappold et al. | 331/177 |
| 3,080,533 | 3/1963 | Edwards | 331/27 X |
| 2,588,551 | 3/1952 | McCoy | 332/29 |
| 3,319,179 | 5/1967 | Hepner | 331/34 X |

*Primary Examiner*—Roy Lake
*Assistant Examiner*—Siegfried H. Grimm
*Attorney*—Imirie & Smiley

[57] ABSTRACT

A circuit for regulating the mean frequency of an oscillating system by temporarily connecting a capacity to said oscillating system by means of an electronic switch controlled by a phase-detecting system to which are applied the frequency of said oscillating system and a reference frequency.

2 Claims, 1 Drawing Figure

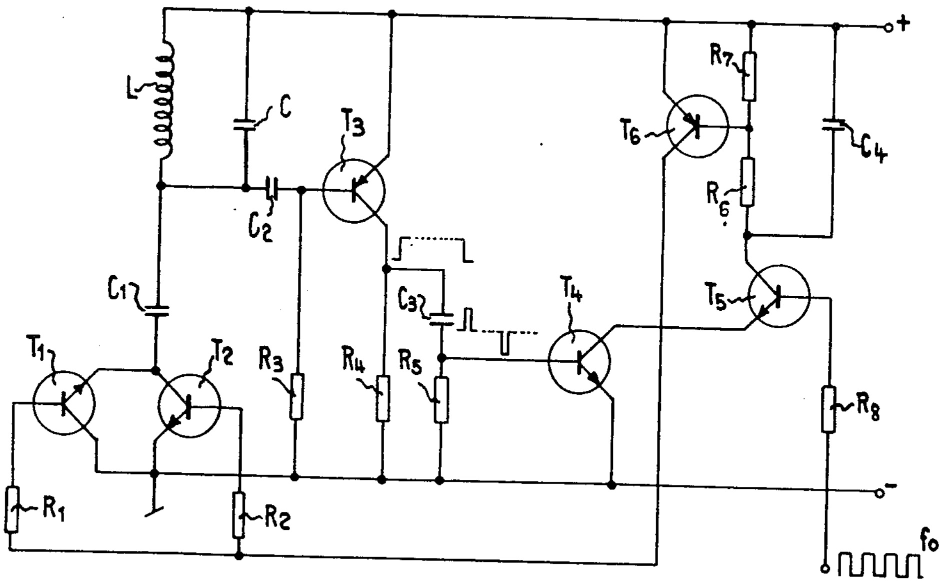
INVENTOR.
JEAN C. BERNEY
BY
Imirie & Smiley
Attys.

CIRCUIT FOR REGULATING THE MEAN FREQUENCY OF AN OSCILLATING SYSTEM

This invention relates to a circuit for regulating the mean frequency of an oscillating system to a value $f = fo/n$, $fo$ being a reference frequency. Such a circuit may preferably be used as a frequency divider, for instance in a quartz clock or watch wherein a stable high frequency has to be divided for driving the wheels of a watch or counter. Prior frequency dividers used for this purpose comprise for instance binary dividing stages and therefore such frequency dividers are complicated and cumbrous and have high energy consumption.

This invention aims in avoiding said disadvantages of prior systems by providing a circuit wherein a capacity causing shifting of said natural frequency by $\Delta f$ $-f/2n$ when connected to said oscillating system is adapted to be connected to this oscillating system by means of an electronic switch controlled for being alternatively fully opened or closed by an on-off detecting system for bringing back said mean frequency of the oscillating system to $f$. With this relatively simple system it is possible to bring back the mean frequency of an oscillating system of limited stability to an accurate value in a fixed ratio to a substantially higher stable reference frequency. In this way relatively high division ratios per stage may be obtained such that a small number of dividing stages are needed for obtaining very high and stable dividing ratios. The stability of each stage is particularly high due to the on - off control of the electronic switch and of the frequency, shifting capacity respectively, as compared with the stability of any system with analogous control.

One embodiment of this invention will now be explained in detail and by way of example with reference to the accompanying drawing.

The oscillating system of this embodiment is constituted by an oscillating circuit LC of which the oscillation is sustained in a manner well known in the art and not shown. A capacity $C_1$ of a suitable value may be connected in parallel with the capacity C of the oscillating circuit by means of an electronic bidirectional switch formed by transistors $T_1$ and $T_2$.

By means of a condenser $C_2$ the sinusoidal oscillation of the oscillating circuit LC is transmitted to the base of a transistor $T_3$ biased through resistor $R_3$. Transistor $T_3$ is a class C amplifier for the signal of the oscillating circuit such that a practically rectangular signal appears at the load resistor $R_4$. This rectangular signal is differenciated by a condenser $C_3$ and a resistor $R_5$ and then amplified by a transistor $T_4$. This transistor forms an AND - gate together with a transistor $T_5$, this gate serving as a phase detector. Transistor $T_5$ is controlled through a resistor $R_8$ by a rectangular signal at a reference frequency or pilot frequency $fo$. Transistors $T_4$ and $T_5$ are series-connected with a memory circuit formed by a condenser $C_4$ and two biasing resistors $R_6$ and $R_7$ connected in series. The tap point between resistors $R_6$ and $R_7$ is connected to the base of a transistor $T_6$, this transistor controlling the electronic switch $T_1$, $T_2$ through two resistors $R_1$ and $R_2$.

The natural resonance frequency of circuit LC is tuned to a value comprised between $f$ and $f + \Delta f$. In other language, the natural frequency of circuit LC is slightly higher than the nominal frequency $fo/n$. However, the frequency of the oscillating circuit may be sufficiently corrected for bringing its mean frequency back to the value $f = fo/n$ when capacity $C_1$ is connected in parallel with the capacity C of the oscillating circuit. To this end the value of the capacity $C_1$ should be selected in such a manner that it causes a frequency shift $\Delta f = -f/2n$ which is sufficient but not too high. For the value $\Delta f$ given above the value of $C_1$ is approximatively equal to C/n.

Control of the bidirectional switch $T_1$, $T_2$ is effected by the phase detector $T_4$, $T_5$. When the pulse amplified by $T_4$ arrives during the period of conduction of $T_5$, that is when transistors $T_4$ and $T_5$ are conducting at the same time, condenser $C_4$ is charged. The time constant of $C_4$, $R_6$ and $R_7$ is so selected that $T_6$ remains conducting during a full period of the oscillating circuit LC. When transistor $T_6$ is conducting transistors $T_1$ and $T_2$ of the electronic switch are also conducting, that is, capacity $C_1$ is connected in parallel with capacity C for reducing the frequency of the oscillating circuit LC to a value $f + \Delta f_R - \Delta f$. When during the next period the pulse amplified by transistor $T_4$ does no longer arrive at the same time as a pulse of the input signal fo, transistor $T_6$ and consequently transistors $T_1$ and $T_2$ remain cut off and the frequency of the oscillating circuit LC increases to the level of $f + \Delta f_R$ until another correction is made when transistors $T_4$ and $T_5$ are conducting at the same time. The mean frequency of the oscillating system is thus maintained at a value of $f = fo/n$.

If $\Delta f_R$ is the deviation of the natural frequency of the oscillating system $(O < \Delta fR < \Delta f)$ $n_o$ is the number of periods during which the switch is open $n_f$ is the number of periods during which the switch is closed then $n_f(\Delta f_R - \Delta f) = n_o \Delta f_R$ $$\frac{n_o}{n_f} = \frac{\Delta f_R - \Delta f}{\Delta f_R}$$

$$\Delta f_R = 0 \qquad \frac{n_o}{n_f} = \infty \text{ switch always open}$$

$$\Delta f_R = +\Delta f \qquad \frac{n_o}{n_f} = 0 \text{ switch always closed}$$

$$\Delta f_R = \frac{\Delta f}{2} \qquad \frac{n_o}{n_f} = \frac{\Delta f - \frac{\Delta f}{2}}{\frac{\Delta f}{2}} = 1$$

A complementary circuit might be provided wherein the electronic switch is opened instead of being closed for correction when the phase detector indicates coincidence of the pulses for cutting out the capacity $C_1$ in order to increase the natural frequency of the oscillating system, this natural frequency being slightly below the nominal mean value of $fo/n$ when capacity $C_1$ is connected to the oscillating system. The oscillating system may also include a mechanical resonator, such as a tuning fork: or the like to which the capacity $C_1$ may be connected for correction of the frequency through an electromechanical transducer.

What is claimed is:

1. A circuit for regulating the mean frequency of an oscillating system to a value $f = fo/n$, fo being a reference frequency and n being a ratio exceeding 1, wherein the natural frequency of said oscillating system is comprised between $f$ and $f + \Delta f$, and wherein a capacity causing shifting of said natural frequency by $\Delta f$ $-f/2n$ whereby n is equal to said ratio $n$, is adapted to be connected to said oscillating system by means of an electronic switch controlled for being alternatively fully opened or closed by an on-off phase detecting system adapted to operate at different input frequencies and having inputs for said reference frequency $fo$ and the frequency of said oscillating system, said detecting system comprising a phase detecting, AND-gate controlled by substantially rectangular pulses at the reference frequency $fo$ and at the frequency of the oscillating system, a memory circuit being connected between said detecting system and said electronic switch, said memory circuit maintaining said switch in open or closed condition in accordance with the last information received from the output of said detecting system, said memory having a condenser in parallel with two series - connected biasing resistors, the tap between said resistors being connected to the base of a control transistor for the electronic switch.

2 A circuit according to claim 1, wherein said AND gate includes transistors, said condenser of the memory circuit being series connected with said transistors of the AND-gate.

* * * * *